US008081757B2

(12) United States Patent
Voessing et al.

(10) Patent No.: US 8,081,757 B2
(45) Date of Patent: Dec. 20, 2011

(54) BLIND WATERMARKING OF AUDIO SIGNALS BY USING PHASE MODIFICATIONS

(75) Inventors: Walter Voessing, Hannover (DE); Peter Georg Baum, Hannover (DE)

(73) Assignee: Thomson Licensing, Boulogne-Billancourt (FR)

( * ) Notice: Subject to any disclaimer, the term of this patent is extended or adjusted under 35 U.S.C. 154(b) by 941 days.

(21) Appl. No.: 11/992,039

(22) PCT Filed: Sep. 4, 2006

(86) PCT No.: PCT/EP2006/065973
§ 371 (c)(1),
(2), (4) Date: Mar. 14, 2008

(87) PCT Pub. No.: WO2007/031423
PCT Pub. Date: Mar. 22, 2007

(65) Prior Publication Data

US 2009/0076826 A1 Mar. 19, 2009

(30) Foreign Application Priority Data

Sep. 16, 2005 (EP) .................................... 05090261

(51) Int. Cl.
*H04L 9/00* (2006.01)
*H04B 1/69* (2011.01)

(52) U.S. Cl. ........................................ 380/238; 382/191

(58) Field of Classification Search .................. 380/238; 382/191

See application file for complete search history.

(56) References Cited

U.S. PATENT DOCUMENTS

| | | | | |
|---|---|---|---|---|
| 6,061,793 | A | 5/2000 | Tewfik | |
| 6,996,521 | B2 * | 2/2006 | Iliev et al. | 704/200 |
| 7,131,007 | B1 * | 10/2006 | Johnston et al. | 713/173 |
| 2004/0170381 | A1 * | 9/2004 | Srinivasan | 386/46 |

(Continued)

FOREIGN PATENT DOCUMENTS

WO 9733391 A 9/1997

OTHER PUBLICATIONS

Tachibana, Ryuki., "Sonic Watermarking", Jan. 2004, EURASIP Journal on Applied Signal Processing, pp. 1955-1964.*

(Continued)

*Primary Examiner* — Matthew Smithers

(74) *Attorney, Agent, or Firm* — Robert D. Shedd; Jeffrey M. Navon

(57) ABSTRACT

Watermarking of audio signals intends to manipulate the audio signal in a way that the changes in the audio content cannot be recognised by the human auditory system. In order to reduce the audibility of the watermark and to improve the robustness of the watermarking the invention uses phase modification of the audio signal. In the frequency domain, the phase of the audio signal is manipulated by the phase of a reference phase sequence, followed by transform into time domain. Because a change of the audio signal phase over the whole frequency range can be audible, the phase manipulation is carried out with a maximum amount only within one or more small frequency ranges which are located in the higher frequencies and/or in noisy audio signal sections, according to psycho-acoustic principles. Preferably, the allowable amplitude of the phase changes in the remaining frequency ranges is controlled according to psycho-acoustic principles. The watermark is decoded from the watermarked audio signal by correlating it with corresponding inversely transformed candidate reference phase sequences.

26 Claims, 3 Drawing Sheets

U.S. PATENT DOCUMENTS

Figure 1:
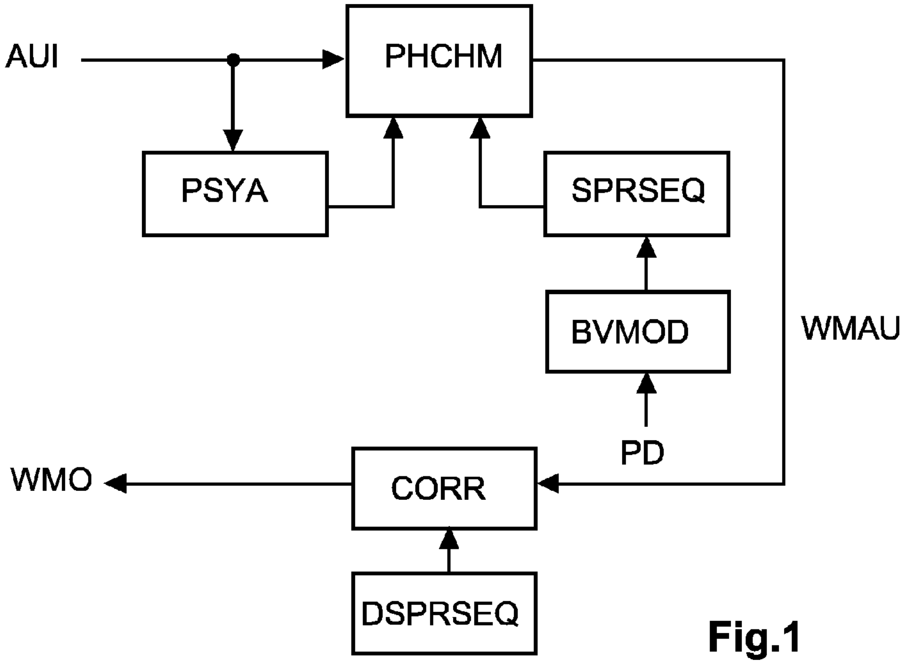

| | | | | |
|---|---|---|---|---|
| 2005/0033579 | A1 | 2/2005 | Bocko et al. | |
| 2005/0043830 | A1 * | 2/2005 | Lee et al. | 700/94 |
| 2006/0147048 | A1 * | 7/2006 | Breebaart et al. | 381/23 |
| 2007/0014428 | A1 * | 1/2007 | Kountchev et al. | 382/100 |
| 2008/0027729 | A1 * | 1/2008 | Herre et al. | 704/273 |

OTHER PUBLICATIONS

Bender W. etal, Techniques for Data Hiding, IBM Systems Journal 35, Nos. 3 & 4, 1996, pp. 313-336.

Kuo SS etal, Covert Audio Watermarking using Perceptually Tuned Signal Independent Multiband Phase Modulation, IEEE Internationel Conference on Acoustics,Speech and Signal Processing (CASSP), May 2002, vol. 2, IEEE Press, pp. 1753-1756.

R. Ansari et al: “Data-Hiding in Audio Using Frequency-Selective Phase Alteration” International Conference on Acoustics. Speech and Signal Processing, vol. 5, May 17, 2004, pp. V-389-392.

Search Report Dated Nov. 3, 2006.

* cited by examiner

BLIND WATERMARKING OF AUDIO SIGNALS BY USING PHASE MODIFICATIONS

This application claims the benefit, under 35 U.S.C. §365 of International Application PCT/EP2006/065973, filed Sep. 4, 2006 which was published in accordance with PCT Article 21(2) on Mar. 22, 2007 in English and which claims the benefit of European patent application No. 05090261.8, filed Sep. 16, 2005.

The invention relates to a method and to an apparatus for transmitting or regaining watermark data embedded in an audio signal by using modifications of the phase of said audio signal.

BACKGROUND

Watermarking of audio signals intends to manipulate the audio signal in a way that the changes in the audio content cannot be recognised by the human auditory system. Most audio watermarking technologies add to the original audio signal a spread spectrum signal covering the whole frequency spectrum of the audio signal, or insert into the original audio signal one or more carriers which are modulated with a spread spectrum signal. There are many possibilities of watermarking to a more or less audible degree, and in a more or less robust way. The currently most prominent technology uses a psycho-acoustically shaped spread spectrum, see for instance WO-A-97/33391 and U.S. Pat. No. 6,061,793. This technology offers a good compromise between audibility and robustness, although its robustness is not optimum.

In an other technology the encoded data, i.e. the watermark, is hidden in the phase of the original audio signal by phase coding: W. Bender, D. Gruhl, N. Morimoto, A. Lu, "Techniques for Data Hiding", IBM Systems Journal 35, Nos. 3&4, 1996, pp. 313-336.

A further technology is phase modulation:
S. S. Kuo, J. D. Johnston, W. Turin, S. R. Quackenbusch, "Covert Audio Watermarking using Perceptually Tuned Signal Independent Multiband Phase Modulation", IEEE International Conference on Acoustics, Speech and Signal Processing (ICASSP), May 2002, vol. 2, IEEE Press, pp. 1753-1756.

INVENTION

However, for some types of audio signals it is not possible to retrieve and decode the spread spectrum at decoder side. If carriers modulated with spread spectrum sequences are used, it is possible to easily remove the carriers by applying notch filters.

A disadvantage of the above phase coding technique is that it is neither robust against cropping nor achieves an acceptable data rate, and both phase related techniques need the original audio signal for decoding and therefore the detector works in a non-blind manner.

The problem to be solved by the invention is to increase the watermark detection reliability at decoder side and to improve the robustness of the watermark signal, thereby still allowing blind detector operation in the decoder. This problem is solved by the methods disclosed in claims 1 and 3. Apparatuses that utilise these methods are disclosed in claims 2 and 4.

The invention uses phase modification of the audio signal for embedding the watermark signal data. A blind detection at decoder side is feasible, i.e. the original audio signal is not required for decoding the watermark signal. In the spectral domain, the phase of the audio signal can be manipulated by the phase of a reference phase sequence (e.g. a spread spectrum sequence or an m-sequence or a pseudo-random distribution of phase values between and including '$-\pi$' and '$+\pi$'). This may include splitting the audio signal in overlapping blocks, transforming these blocks with the Fourier or any other time-to-frequency domain transform and changing the original phase based on pseudo-random numbers of a reference phase sequence and a model of the human auditory system, inversely (Fourier) transforming the phase-changed spectrum back into the time domain and carrying out an overlap/add on the blocks. The resulting changed audio signal sounds like the original one.

Because a change of the audio signal phase over the whole frequency range can be audible, a strong (e.g. $-\pi/+\pi$) phase manipulation is carried out only within one or more small frequency ranges which are located in the higher frequencies and/or in noisy audio signal sections, the corresponding frequency ranges being determined according to psycho-acoustic principles.

In a further embodiment, in the remaining frequency ranges the phase values can be changed, too, the allowable extent of the phase changes being controlled according to psycho-acoustic principles. In addition, the amplitude of (less audible) spectral bins can be changed according to psycho-acoustic principles in order to allow even greater (non-audible) phase changes.

The watermarked audio signal is decoded at decoder side by correlating the received audio signal with corresponding inversely (Fourier) transformed candidate reference phase sequence which had been used in the encoding, or by using a matched filter instead of correlation.

The invention achieves a good compromise between robustness and audibility, achieves a high data rate, facilitates a real-time processing and is suitable for embedded systems.

In principle, the inventive method is suited for watermarking data embedded in an audio signal by using modifications of the phase of said audio signal, said method including the steps:

- controlling by the value of a current bit of said watermark data the selection or the generation of a corresponding reference data sequence;
- modifying, according to said corresponding reference data sequence, phase values in a current time-to-frequency domain converted block of said audio signal, whereby within said current block the allowable frequency range or ranges for said phase value modification by a pre-determined maximum amount are determined by psycho-acoustic related calculations;
- frequency-to-time domain converting the modified version of said current block of said audio signal;
- outputting the corresponding section of the watermarked audio signal.

In principle the inventive apparatus is suited for watermarking data embedded in an audio signal by using modifications of the phase of said audio signal, said apparatus including:

- means being adapted for controlling by the value of a current bit of said watermark data the selection or the generation of a corresponding reference data sequence;
- means being adapted for modifying, according to said corresponding reference data sequence, phase values in a current time-to-frequency domain converted block of said audio signal, whereby within said current block the allowable frequency range or ranges for said phase value modification by a pre-determined maximum amount are determined by psycho-acoustic related calculations;

means being adapted for frequency-to-time domain converting the modified version of said current block of said audio signal, and for outputting the corresponding section of the watermarked audio signal.

In principle the inventive watermark decoding is suited for regaining watermark data that were embedded in an audio signal by using modifications of the phase of said audio signal, wherein the value of a current bit of said watermark data was controlled by the selection or the generation of a corresponding reference data sequence and, according to said corresponding reference data sequence, phase values in a current time-to-frequency domain converted block of said audio signal were modified, whereby within said current block the allowable frequency range or ranges for said phase value modification by a pre-determined maximum amount was determined by psycho-acoustic related calculations, and the modified version of said current block of said audio signal was frequency-to-time domain converted so as to form a corresponding section of the watermarked audio signal, said method including the steps:

correlating or matching a current block of said watermarked audio signal with a frequency-to-time domain converted version of candidates of said reference data sequences;

determining from the correlation or matching result a bit value of said watermark data.

In principle the inventive watermark decoding apparatus is suited for regaining watermark data that were embedded in an audio signal by using modifications of the phase of said audio signal, wherein the value of a current bit of said watermark data was controlled by the selection or the generation of a corresponding reference data sequence and, according to said corresponding reference data sequence, phase values in a current time-to-frequency domain converted block of said audio signal were modified, whereby within said current block the allowable frequency range or ranges for said phase value modification by a pre-determined maximum amount was determined by psycho-acoustic related calculations, and the modified version of said current block of said audio signal was frequency-to-time domain converted so as to form a corresponding section of the watermarked audio signal, said apparatus including:

means being adapted for generating or storing frequency-to-time domain converted versions of candidates of said reference data sequences;

means being adapted for correlating or matching a current block of said watermarked audio signal with a frequency-to-time domain converted version of candidates of said reference data sequences, and for determining from the correlation or matching result a bit value of said watermark data.

Advantageous additional embodiments of the invention are disclosed in the respective dependent claims.

DRAWINGS

Figure 2:
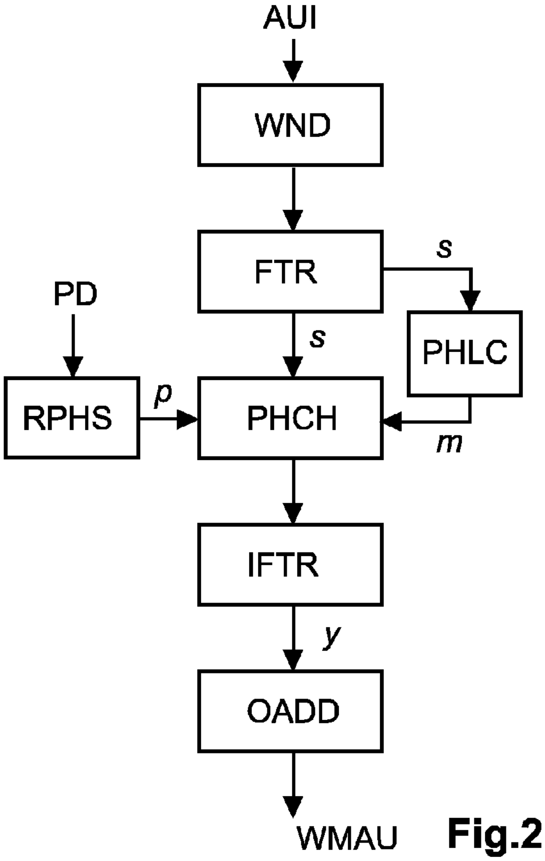
Figure 4:
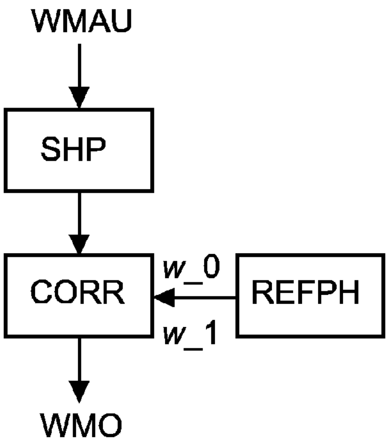
Figure 3:
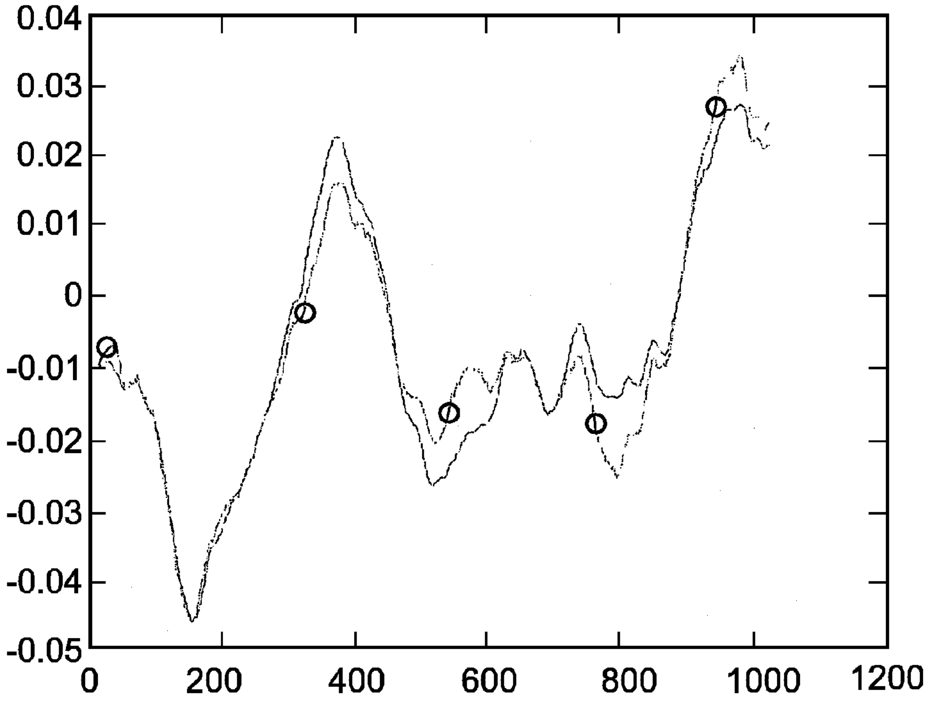
Figure 5:
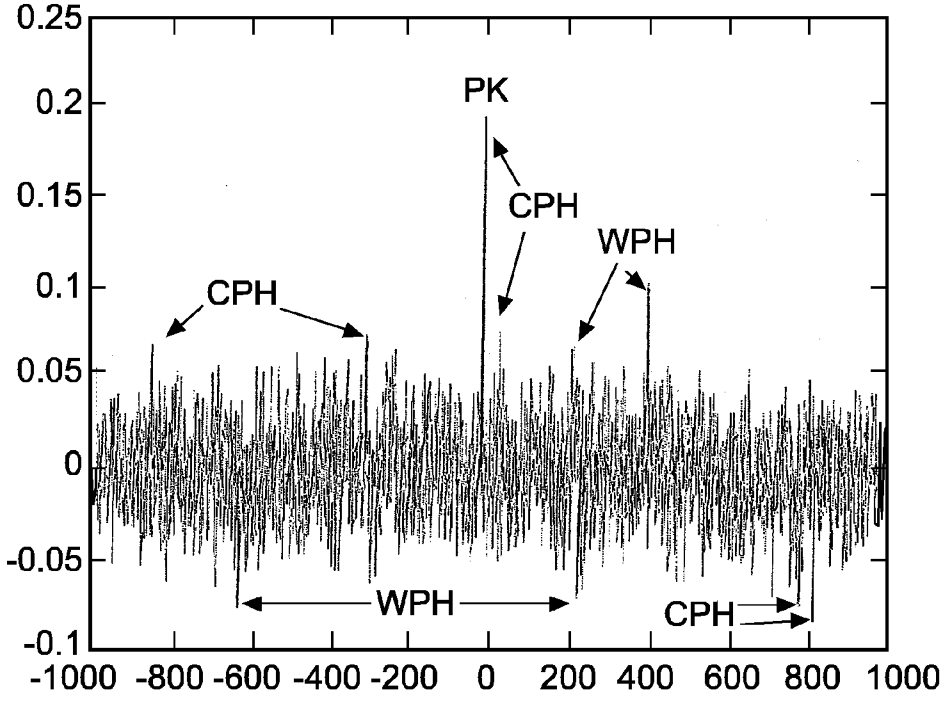
Figure 6:
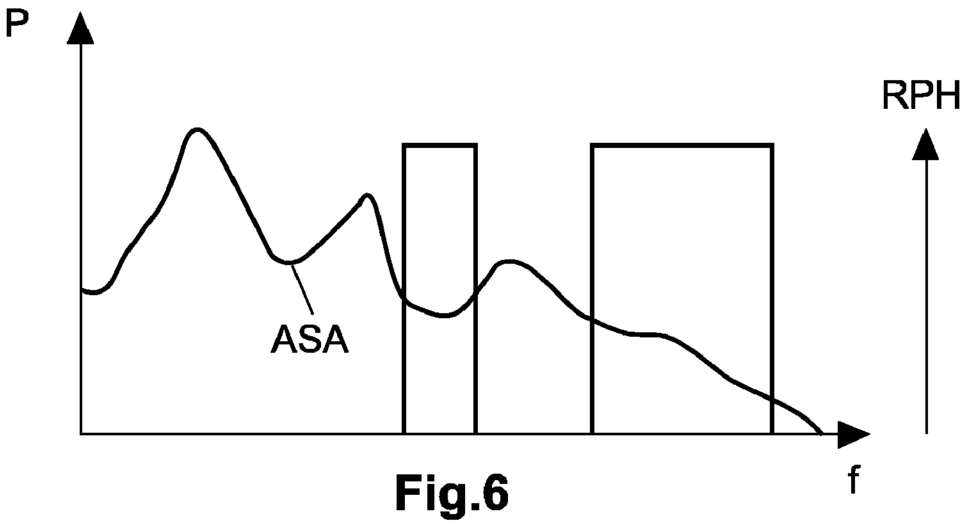
Figure 7:
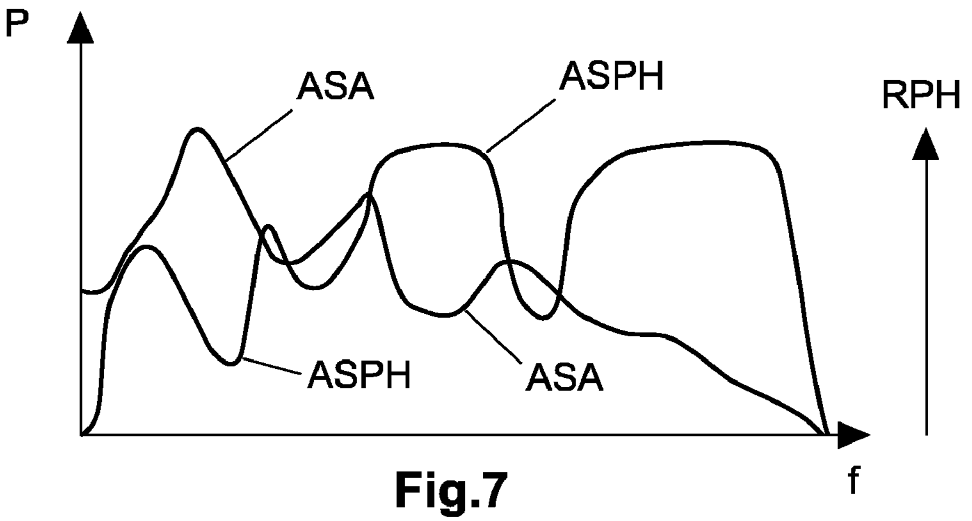
Figure 8:
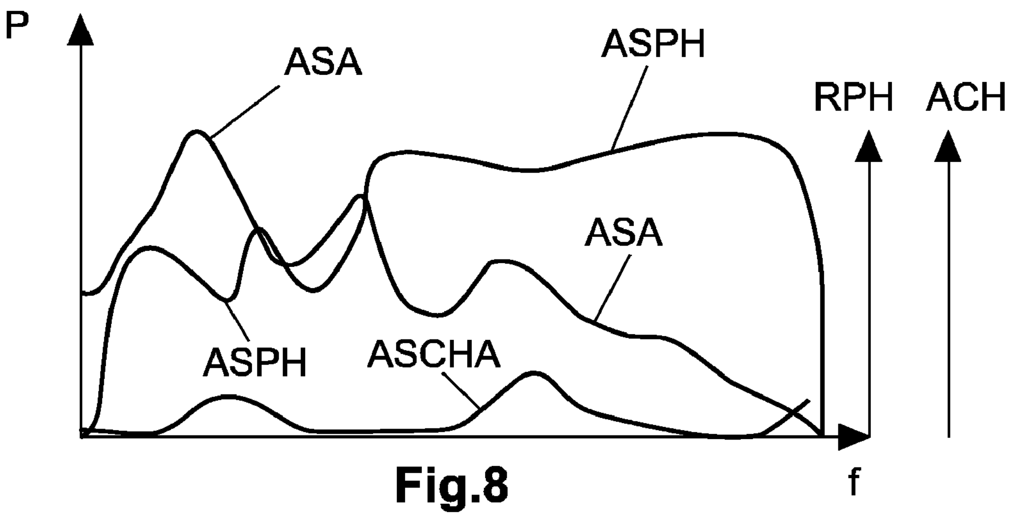

Exemplary embodiments of the invention are described with reference to the accompanying drawings, which show in:

FIG. 1 simplified block diagram of an inventive watermark encoder and decoder;

FIG. 2 more detailed watermark encoder block diagram;

FIG. 3 original and watermarked audio signal in time domain;

FIG. 4 watermark decoder block diagram;

FIG. 5 correlation result;

FIG. 6 yes/no phase changes in specific areas of the audio signal spectrum;

FIG. 7 additional psycho-acoustically controlled phase changes in other areas of the audio signal spectrum;

FIG. 8 increased phase changes in the audio signal spectrum based on amplitude changes in the audio signal spectrum.

EXEMPLARY EMBODIMENTS

In FIG. 1, at encoder side, an original audio input signal AUI is fed (framewise or blockwise) to a phase change module PHCHM and to a psycho-acoustic calculator PSYA in which the current psycho-acoustic properties of the audio input signal are determined and which controls in which frequency range or ranges and/or at which time instants stage PHCHM is allowed to assign watermark information to the phase of the audio signal. The phase modifications in stage PHCHM are carried out in the frequency domain and the modified audio signal is converted back to the time domain before it is output. These conversions into frequency domain and into time domain can be performed by using an FFT and an inverse FFT, respectively. The corresponding phase sections of the audio signal are manipulated in stage PHCHM according to the phase of a spread spectrum sequence (e.g. an m-sequence) stored or generated in a spreading sequence stage SPRSEQ. The watermark information, i.e. the payload data PD, is fed to a bit value modulation stage BVMOD that controls stage SPRSEQ correspondingly. In stage BVMOD a current bit value of the PD data is used to modulate the encoder pseudo-noise sequence in stage SPRSEQ. For example, if the current bit value is '1', the encoder pseudo-noise sequence is left unchanged whereas, if the current bit value corresponds to '3', the encoder pseudo-noise sequence is inverted. That sequence consists of a 'random' distribution of values and preferably has a length corresponding to that of the audio signal frames.

The current frequency range or ranges which are used for the phase changes depend on the current audio signal AUI and are dynamically determined by the psycho-acoustic model. The phase manipulation can be carried out at different frequency ranges in order to prevent a cut-off of these areas. It is also possible to additionally add a 'normal' spread spectrum watermark signal to the amplitude of the audio signal in the time or frequency domain.

The phase change module PHCHM outputs a corresponding watermarked audio signal WMAU.

At decoder side, the watermarked audio signal WMAU passes (framewise or blockwise) through a correlator CORR in which its phase is correlated with one or more frequency-to-time domain converted versions of the candidate decoder spreading sequences or pseudo-noise sequences (one of which was used in the encoder) stored or generated in a decoder spreading sequence stage DSPRSEQ. The correlator provides a bit value of the corresponding watermark output signal WMO.

Advantageously, the correlation output at decoder side contains always a meaningful peak (corresponding to a watermark information bit), which is often not the case if a (shaped) spreading sequence was added to the audio signal amplitude. It is not possible to remove this kind of watermarking from the audio signal without destroying the quality of the audio signal drastically. The robustness of the watermarking is therefore increased.

Instead of modifying the phase in specific frequency range or ranges and/or at specific time instants only, under certain conditions the whole frequency range can be subject to the phase modifications.

An example implementation of this embodiment is as follows. Two different phase vectors p__0 and p__1 are created, each one comprising 513 pseudo random numbers between −π and π (in practise, the first and the last value is never used, but for the sake of simplicity this fact is omitted here).

In FIG. 2, the audio input signal AUI is cut into blocks or frames of length 1024 samples in a windowing stage WND. The first block is transformed in Fourier transformer FTR into spectral domain using FFT, which results in a vector s(amplitude, phase) of length 513. Based on psycho-acoustic laws, in a phase limit calculator PHLC for each bin of the current spectral block a maximum allowable phase shift is computed that can be applied to its phase value without becoming audible, resulting in vector m (phase only). Because the coefficient or bin located at frequency zero has no phase value, the first and the last element of vector m are zero.

If a 'zero' payload (i.e. watermark) data PD bit shall be transmitted, a vector p (phase only) is generated in a reference phase section stage RPHS with p=p__0, if a watermark data bit 'one' shall be transmitted, a vector p is generated with p=p__1.

A new vector d is calculated in a phase modification stage PHCH by d=p−phase(s), and for each bin j of vector d a normalisation step is carried out:

if d(j)<−π then d(j)=2π+d(j)
elseif d(j)>π then d(j)=−2π+d(j)
else d(j) remains unchanged
end.

Next the psycho-acoustical limits that were checked in stage PHLC are taken into account in stage PHCH by calculating for each bin i:

if d(j)<−m(j) then d(j)=−m(j)
elseif d(j)>m(j) then d(j)=m(j)
else d(j) remains unchanged
end.

In the next step a modified audio signal y is calculated in an inverse Fourier transform stage IFTR as $$y=IFFT(|s|e^{i(phase(s)+d)}),$$

where i denotes the imaginary number. This modified audio signal sounds like the original signal, but contains a watermarking data bit.

Blocking artefacts can be reduced in an overlap-and-add stage OADD by overlapping blocks for example with a well-known sine window.

FIG. 3 shows an example plot of the original phase of a block of signal s and the modified phase marked by 'o' of that signal block, whereby a very crude psycho-acoustic model was used that allows at maximum a 10-degree phase shift at each frequency bin.

FIG. 4 shows the data flow in the inventive watermark decoder. The watermarked audio signal WMAU passes (framewise or blockwise) through an optional shaping stage SHP to a correlator CORR. The shaping amplifies or attenuates the received audio signal such that its amplitude level becomes flat, or gets value '1'. To the reference phase values represented by vectors p=p__0 and p=p__1 (which are known at decoder side) flat amplitude values (e.g. '1') are assigned and the resulting sets or sequences of complex numbers are thereafter IFFT transformed in a reference phases stage REFPH resulting in reference vectors or sequences w_0 and w_1, or are already stored in this IFFT transformed format in stage REFPH, i.e.:

$$w\_0=IFFT(e^{ip\_0}),\ w\_1=IFFT(e^{ip\_1}).$$

These two vectors or pseudo-noise sequences w_0 and w_1 are correlated in the time domain in correlator CORR with the shaped watermarked audio signal.

A correlation of a watermarked audio signal with a sequence w_0 or w_1 that has the same phase vector like the embedded watermark data bit will show a peak PK in the correlation result, whereas a correlation of that watermarked audio signal with the other sequence w_1 or w_0, respectively, shows only noise in the correlation result. The correlator assigns the corresponding bit values and provides the thereby resulting watermark output signal WMO.

FIG. 5 shows the correlation result for the example phase signal of FIG. 3. "CPH" marks part of the correct phase signal whereas "WPH" marks part of the wrong phase signal.

In FIG. 1 and FIG. 4, the correlator CORR can be replaced by an appropriate matched filter, leading to the same result.

Theoretically it is sufficient to use only a single phase vector for the transmission of one watermark data bit, and to use e.g. the original vector for transmitting a 'one' and the same vector tuned by '−π' for transmitting a 'zero'. But experiments have shown that the processing is much more robust if two different phase vectors are used.

It is possible to transmit several watermark data bits per audio signal block in case several different random phase vectors per block are used and each value is mapped to one phase vector.

The basic technology of the inventive processing can be combined with features known from spread spectrum watermarking:

- splitting the payload in independent frames which start with synchronisation blocks followed by payload bits that are protected by error correction;
- encoding the same payload value with different phase vectors depending on the current content of the audio signal;
- skipping audio signal frames depending on current the audio signal content and signalling this skipping to the decoder.

A further improvement can be achieved by not only considering the phase, but also the amplitude of the audio signal. For example, in the described implementation, the psycho-acoustic module PSYA or PHLC determines that at a certain frequency bin a phase shift of 10 degree is not audible. An improved psycho-acoustic module will determine that the 10 degree phase shift is not audible only with the given current amplitude, but if a current amplitude were half a 15 degree phase shift would be permissible still without being audible. In this case the amplitude value or values of the original spectrum would be halved and their corresponding phase values would be changed by 15°.

FIGS. 6 to 8 illustrate three embodiments of the invention.

FIG. 6 shows in a power P/frequency f presentation the original audio spectrum amplitude ASA in a current audio block. In specific frequency ranges of the audio signal spectrum the phase values are set to a predetermined maximum audio signal phase change value ASPH. The scale at the right border shows the relative phase change RPH.

In FIG. 7 there are additional phase changes ASPH in other frequency ranges of the audio signal spectrum, the amount of which phase changes is determined according to psycho-acoustics. In other words, within the current block, in the frequency domain, in the remaining frequency range or ranges other than the frequency range or ranges with maximum (e.g. −π/+π) phase value modification, the phase of the audio signal is modified adaptively using psycho-acoustic calculations by an amount that is smaller than the maximum amount.

FIG. 8 shows still further increased phase changes in the audio signal spectrum based on amplitude changes ASPH in the audio signal spectrum, in response to an audio signal changed amplitude ASCHA (the amount of which is exaggerated in the drawing). The most right scale shows the amplitude change ACH.

The invention claimed is:

1. A method for watermarking data embedded in a non-transitory audio signal by using modifications of the phase values of the amplitude-phase vector s of a current time-to-frequency domain converted block of said audio signal, said method comprising the steps:

controlling by the value of a current bit of said watermark data the selection or the generation of a corresponding pseudo-random reference data sequence, of which reference data sequence the phase values vector in the frequency domain is denoted p;

modifying, according to said corresponding reference data sequence, phase values of said current time-to-frequency domain converted audio signal block by a phase values vector d, $d = p - \text{phase}(s)$, wherein on one hand each bin of vector d is incremented by $2\pi$ if it is lower than $-\pi$ and decremented by $2\pi$ if it is greater than $\pi$ and on the other hand each bin of vector d is further limited to a corresponding value in a phase values vector m, in which vector m a pre-determined maximum amount for said phase value modification is determined by psycho-acoustic related calculations;

frequency-to-time domain converting the modified version of said current block of said audio signal;

outputting the corresponding section of the watermarked audio signal.

2. Method according to claim 1, wherein said time-to-frequency conversion is an FFT and said frequency-to-time domain conversion is an inverse FFT.

3. Method according to claim 1, wherein said audio signal at the input is windowed in an overlapping manner, and is correspondingly overlapped and added at the output.

4. Method according to claim 1, wherein said phase values modification corresponding to a reference data sequence is a modification corresponding to the phase of a spread spectrum sequence or an m-sequence.

5. Method according to claim 1, wherein within said current block, in the frequency domain, in the remaining frequency range or ranges other than said frequency range or ranges with phase value modification by a pre-determined maximum amount, the phase of the audio signal is modified adaptively using psycho-acoustic calculations by an amount that is smaller than said pre-determined maximum amount.

6. Method according to claim 1, wherein in the frequency domain the amplitude of the audio signal in one or more frequency ranges is modified using psycho-acoustic calculations such that the allowable phase modification in these one or more frequency ranges is increased.

7. A method for regaining watermark data that were embedded in a non-transitory audio signal by using modifications of the phase values of the amplitude-phase vector s of a current time-to-frequency domain converted block of said audio signal, wherein the value of a current bit of said watermark data was controlled by the selection or the generation of a corresponding pseudo-random reference data sequence, of which reference data sequence the phase values vector in the frequency domain is denoted p and, according to said corresponding reference data sequence, phase values of said current time-to-frequency domain converted audio signal block were modified by a phase values vector d, $d = p - \text{phase}(s)$, wherein on one hand each bin of vector d was incremented by $2\pi$ if it is lower than $-\pi$ and decremented by $2\pi$ if it is greater than $\pi$ and on the other hand each bin of vector d was further limited to a corresponding value in a phase values vector m, in which vector m a pre-determined maximum amount for said phase value modification was determined by psycho-acoustic related calculations, and wherein the modified version of said current block of said audio signal was frequency-to-time domain converted so as to form a corresponding section of the watermarked audio signal, said method including the steps:

correlating or matching a current block of said watermarked audio signal with a frequency-to-time domain converted version of candidates of said pseudo-random reference data sequences, wherein flat amplitude values are assigned to a candidate phase values vector p before said frequency-to-time domain conversion;

determining from the correlation or matching result a bit value of said watermark data.

8. Method according to claim 7, wherein said time-to-frequency conversion is an FFT and said frequency-to-time domain conversion is an inverse FFT.

9. Method according to claim 7, wherein said audio signal at the input is windowed in an overlapping manner, and is correspondingly overlapped and added at the output.

10. Method according to claim 7, wherein before said correlating or matching said watermarked audio signal is shaped such that its amplitude levels becomes flat, or get value '1'.

11. Method according to claim 7, wherein said phase values modification corresponding to a reference data sequence is a modification corresponding to the phase of a spread spectrum sequence or an m-sequence.

12. Method according to claim 7, wherein within said current block, in the frequency domain, in the remaining frequency range or ranges other than said frequency range or ranges with phase value modification by a pre-determined maximum amount, the phase of the audio signal is modified adaptively using psycho-acoustic calculations by an amount that is smaller than said pre-determined maximum amount.

13. Method according to claim 7, wherein in the frequency domain the amplitude of the audio signal in one or more frequency ranges is modified using psycho-acoustic calculations such that the allowable phase modification in these one or more frequency ranges is increased.

14. An apparatus for watermarking data embedded in an audio signal by using modifications of the phase values of the amplitude-phase vector s of a current time-to-frequency domain converted block of said audio signal, said apparatus comprising:

means being adapted for controlling by the value of a current bit of said watermark data the selection or the generation of a corresponding pseudo-random reference data sequence, of which reference data sequence the phase values vector in the frequency domain is denoted p;

means being adapted for modifying, according to said corresponding reference data sequence, phase values of said current time-to-frequency domain converted audio signal block by a phase values vector d, $d = p - \text{phase}(s)$, wherein on one hand each bin of vector d is incremented by $2\pi$ if it is lower than $-\pi$ and decremented by $2\pi$ if it is greater than π and on the other hand each bin of vector d is further limited to a corresponding value in a phase values vector m, in which vector m a pre-determined maximum amount for said phase value modification is determined by psycho-acoustic related calculations;

means being adapted for frequency-to-time domain converting the modified version of said current block of said audio signal, and for outputting the corresponding section of the watermarked audio signal.

15. Apparatus according to claim 14, wherein said time-to-frequency conversion is an FFT and said frequency-to-time domain conversion is an inverse FFT.

16. Apparatus according to claim 14, wherein said audio signal at the input is windowed in an overlapping manner, and is correspondingly overlapped and added at the output.

17. Apparatus according to claim 14, wherein said phase values modification corresponding to a reference data sequence is a modification corresponding to the phase of a spread spectrum sequence or an m-sequence.

18. Apparatus according to claim 14, wherein within said current block, in the frequency domain, in the remaining frequency range or ranges other than said frequency range or ranges with phase value modification by a pre-determined maximum amount, the phase of the audio signal is modified adaptively using psycho-acoustic calculations by an amount that is smaller than said pre-determined maximum amount.

19. Apparatus according to claim 14, wherein in the frequency domain the amplitude of the audio signal in one or more frequency ranges is modified using psycho-acoustic calculations such that the allowable phase modification in these one or more frequency ranges is increased.

20. An apparatus for regaining watermark data that were embedded in an audio signal by using modifications of the phase values of the amplitude-phase vector s of a current time-to-frequency domain converted block of said audio signal, wherein the value of a current bit of said watermark data was controlled by the selection or the generation of a corresponding pseudo-random reference data sequence, of which reference data sequence the phase values vector in the frequency domain is denoted p and, according to said corresponding reference data sequence, phase values of said current time-to-frequency domain converted audio signal block were modified by a phase values vector d, $d=p-\text{phase}(s)$, wherein on one hand each bin of vector d was incremented by 2π if it is lower than −π and decremented by 2π if it is greater than π and on the other hand each bin of vector d was further limited to a corresponding value in a phase values vector m, in which vector m a pre-determined maximum amount for said phase value modification was determined by psycho-acoustic related calculations, and wherein the modified version of said current block of said audio signal was frequency-to-time domain converted so as to form a corresponding section of the watermarked audio signal, said apparatus comprising:

means being adapted for generating or storing frequency-to-time domain converted versions of candidates of said reference data sequences;

means being adapted for correlating or matching a current block of said watermarked audio signal with a frequency-to-time domain converted version of candidates of said pseudo-random reference data sequences, wherein flat amplitude values are assigned to a candidate phase values vector p before said frequency-to-time domain conversion, and for determining from the correlation or matching result a bit value of said watermark data.

21. Apparatus according to claim 20, wherein said time-to-frequency conversion is an FFT and said frequency-to-time domain conversion is an inverse FFT.

22. Apparatus according to claim 20, wherein said audio signal at the input is windowed in an overlapping manner, and is correspondingly overlapped and added at the output.

23. Apparatus according to claim 20, wherein before said correlating or matching said watermarked audio signal is shaped such that its amplitude levels becomes flat, or get value '1'.

24. Apparatus according to claim 20, wherein said phase values modification corresponding to a reference data sequence is a modification corresponding to the phase of a spread spectrum sequence or an m-sequence.

25. Apparatus according to claim 20, wherein within said current block, in the frequency domain, in the remaining frequency range or ranges other than said frequency range or ranges with phase value modification by a pre-determined maximum amount, the phase of the audio signal is modified adaptively using psycho-acoustic calculations by an amount that is smaller than said pre-determined maximum amount.

26. Apparatus according to claim 20, wherein in the frequency domain the amplitude of the audio signal in one or more frequency ranges is modified using psycho-acoustic calculations such that the allowable phase modification in these one or more frequency ranges is increased.

* * * * *